Patented Apr. 12, 1949

2,467,055

UNITED STATES PATENT OFFICE 2,467,055

PROCESS OF PREPARING RESINOUS MOLDING POWDERS

Marcel Sans, Lyon, Yves Linizan, Paris, and Robert Michon, Saint-Fons, France, assignors to Societe Anonyme des Manufactures des Glaces et Produits Chimiques de Saint-Gobain, Chauny & Cirey, Paris, France No Drawing. Application January 26, 1946, Serial No. 643,738. In France February 9, 1945

4 Claims. (Cl. 260—96)

The present invention refers to the production of molding powders containing thermoplastic resins and particularly vinyl resins.

The process generally used for the production of those powders consists in gelatinizing the resin, with or without the addition of a solvent, by the action of heat and pressure, for example by passing it through a rolling machine with heated cylinders, cooling such resin, and reducing into powder the obtained mass by passing it through crushers and grinders.

The known process has the drawback of using numerous and important mechanical means, at a comparatively high temperature which may result in a certain instability of the yielded product. Moreover, in the case of a high proportion of plasticizer, the mass thus gelatinized by the known process under the action of heat and pressure, may have, even after coding, such a consistency that it is difficultly reduced into powder by crushing and grinding, and it is then necessary to have recourse to the complicated process of chipping the plates coming out of the rolling machine into fine bits which will be used as a moulding powder.

The process for manufacturing moulding powders which is the object of the present invention obviates such drawbacks.

It consists in incorporating into the resin, to which plasticizers, lubricants, stabilizers or fillers are eventually added, a swelling agent of solvent or non-solvent character, and then in eliminating such agent by the action of heat and/or vacuum, and finally bringing the resin back to the normal temperature and pressure conditions, submitting the resinous mass to a stirring action while the swelling agent is eliminated and while the normal temperature and pressure conditions are brought back.

In the operating cycle, an overheating period may be inserted after the elimination of the swelling agent, so as to complete the plasticization of the material.

In practice, during the incorporation of the swelling agent, the material is submitted to a stirring action facilitating such incorporation. It has been found advantageous to stir without any interruption during all the operating cycle. It is thus possible to carry out the successive operations of the cycle in a single apparatus. But it is possible, if desired, to stop the stirring after the incorporation of the swelling agent, and to resume it in an other apparatus to continue and complete the treatment.

We ascertained that at the end of those operations, and without the intervention of pressure, the resin is in the form of grains.

The grains thus obtained are of homogeneous composition and of a uniform size: they constitute an excellent molding powder.

Our research work moreover enabled us to ascertain that the size of the grains of the powder is a function of the duration and of the temperature of the heating operation that causes the elimination of the swelling agent and the overheating, the grains being the smaller as these operations are the rougher.

The incorporation of a swelling agent which may take place at ordinary temperature or at a higher temperature, may be accomplished at a temperature sufficiently high to cause the evaporation of the swelling agent, provided that during such evaporation the parts of the swelling agent which are distilling are brought back into the stirring apparatus.

The advantages of the process according to the invention over the above described known process are the following:

1. To an expensive operation effected in several apparatuses there is substituted an operation requiring less power, and accomplished in a single apparatus.

2. The yielded products are more stable as they are prepared at a lower temperature.

3. The lubricants and fillers are more easily incorporated.

4. The desired size of grains is directly obtained by a mere control of the temperatures and of the durations of elimination of the swelling agent and of overheating.

5. The moulding powders are obtained from products containing much plasticizer, which it is difficult to obtain in the form of grains by the known process.

Example I

In a mixer of the Werner type with tight cover, electric heating and water-cooling, and provided with a back-flow condenser, there are introduced 800 grams of polyvinyl chloride, 10 grams of lead phenate as a stabilizer and 10 grams of sodium stearate as a lubricant; the materials are stirred during 10 minutes. The mixer being closed, there is introduced through the condenser a mixture of 300 grams of acetone-benzene (50/50 by weight) as swelling solvent agent with 200 grams of tricresyl phosphate as a plasticizer. The materials are stirred during half an hour, the temperature being maintained at 70°, and the back flow condenser being operated so that it brings back into the mixer the acetone-benzene which has evaporated, such stirring operation, as a result, thoroughly incorporates the swelling agent into the mass. The back flow is then suppressed, and while continuing to stir, the heating is brought to 100° C. and maintained at that temperature for 20 minutes so as to eliminate the swelling agent and thereafter to cause an overheating of the mass; then the mass is cooled without stopping the stirring.

There is obtained a moulding powder, 95% of which passes through a sieve the opening of which between two successive wires of the mesh is 2.5 mm. and remains on a sieve the opening of which between two successive wires of the mesh is 2 mm.

It may be noted that when using the above mentioned known process for the obtention of a moulding powder of the same resin, the gelatinisation would have been operated on a hot cylinder of the rolling machine at a temperature of 180° C.

Example II

As in the preceding example, there are introduced in the mixer 800 grs. of copolymer vinyl chloride/vinyl acetate (85/15) and 10 grs. of lead acetate. The materials are stirred during 10 minutes. The mixer being closed, there are introduced through the condenser 300 grs. of ethyl acetate and 200 grs. of tricresyl phosphate. The materials are stirred during one hour while the solvent is continuously distilled and brought back into the mixer. The solvent is then evaporated off in twenty minutes by raising the temperature, and the mass is cooled in half an hour without stopping the stirring.

There is obtained a molding powder, the grain size of which depends on the temperature and duration of the overheating during the evaporation.

Example III 800 grs. of polystyrene
300 grs. of a mixture of 50% of ethylacetate and 50% of benzene as swelling agent
200 grs. of tricresylphosphate as plasticizer are treated as in the preceding example, and a similar product is obtained.

Example IV 800 grs. of ethylcellulose
300 grs. of toluene as swelling agent
100 grs. of dibutylphthalate as plasticizer are treated as in the preceding example, and a similar product is obtained.

The process of our invention which was hereabove described for a discontinuous operation may be carried out in a continuous way by transposing in space the operations which were above described as successive in time, for example by means of an endless screw especially equipped so that the material be mixed while being moved forward. The material thus successively passes through zones where will take place the characteristic operations of the invention: feeding the elements of the mixture, mixing, eliminating the swelling agent, overheating, discharging in the form of grains. Such continuous process is particularly suitable for an easy recovery of the swelling agent in the zone where same is eliminated.

We claim:

1. A process for preparing solid, granular molding powders that comprises incorporating into a thermoplastic resin a swelling agent for the resin, maintaining the resin at a temperature at which the said agent is removed by evaporation under the conditions of pressure pertaining, and bringing back the resin to normal temperature, the resin being granulated by stirring during the removal of the swelling agent and the bringing back to normal temperature.

2. A process for preparing solid, granular molding powders that comprises incorporating into a vinyl resin a swelling agent, heating the resin to a temperature at which the said agent is removed by evaporation, and bringing back the resin to normal temperature after the removal of the swelling agent, the resin being subjected to granulation by stirring during the elimination of the swelling agent and the bringing back to normal temperature.

3. A process for preparing solid granular molding powders that comprises incorporating into a vinyl resin a plasticizer and a swelling agent, evaporating off said swelling agent, completing the plasticization of the material after the removal of the swelling agent by heating the resin to a temperature above that necessary for said evaporation, and bringing back the resin to normal temperature, the resin being granulated by stirring during the removal of the swelling agent and the bringing back to normal temperature.

4. A process for preparing solid granular molding powders that comprises incorporating into a vinyl chloride resin a swelling agent at about the temperature of ebullition of said agent, bringing back into the resin the parts of the swelling agent which are distilled, removing said swelling agent by evaporation, and bringing back the resin to normal temperature, the resin being granulated by stirring during the removal of the swelling agent and the bringing back to normal temperature.

MARCEL SANS.
YVES LINIZAN.
ROBERT MICHON.

REFERENCES CITED

The following references are of record in the file of this patent:

UNITED STATES PATENTS

| Number | Name | Date |
|---|---|---|
| 1,436,820 | Plauson | Nov. 28, 1932 |
| 2,270,182 | Collings et al. | Jan. 13, 1942 |
| 2,407,061 | Dahle | Sept. 3, 1946 |

FOREIGN PATENTS

| Number | Country | Date |
|---|---|---|
| 500,298 | Great Britain | Feb. 7, 1939 |